UNITED STATES PATENT OFFICE.

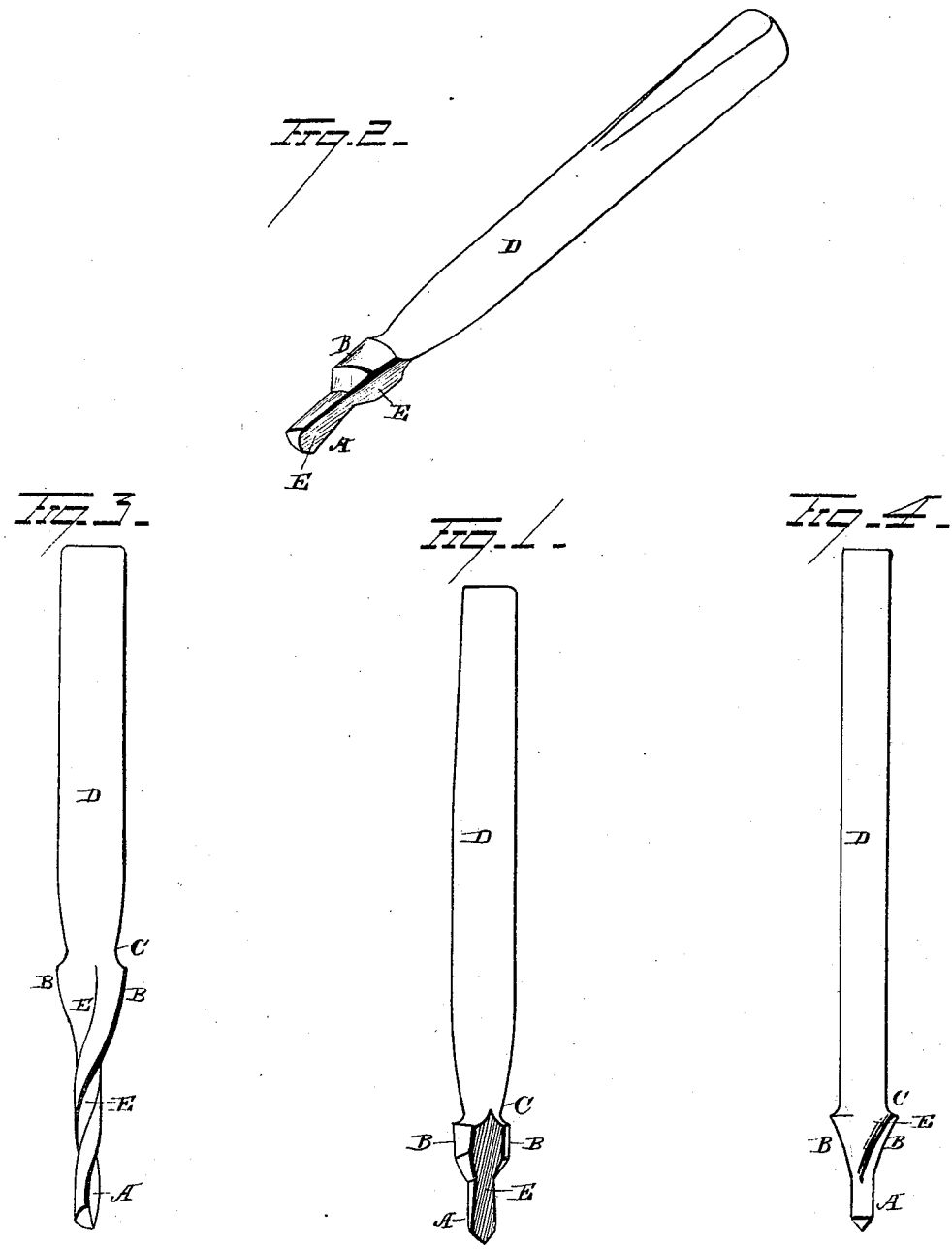

WILLIAM H. SOUTHWICK, OF NEW BEDFORD, MASSACHUSETTS.

COMBINED DRILL AND COUNTERSINK.

SPECIFICATION forming part of Letters Patent No. 252,704, dated January 24, 1882.

Application filed August 26, 1881. (No model.)

*To all whom it may concern:*

Be it known that I, WILLIAM H. SOUTHWICK, of New Bedford, in the county of Bristol and State of Massachusetts, have invented certain new and useful Improvements in Drills for Boring Metal; and I do hereby declare the following to be a full, clear, and exact description of the invention, such as will enable others skilled in the art to which it pertains to make and use the same.

My invention relates to an improvement in metal-boring tools, the object being to adapt a twist-drill of the ordinary construction to successively drill a hole and form a countersink at its mouth. With this end in view my invention consists in a cylindrical drill having beveled enlargements on opposite sides of its upper end, provided with a clearance-space between the said enlargements and the drill-shank, and having flutes extending from the point of the drill into the clearance-space.

In the accompanying drawings, Figure 1 is a front view of my improved drill. Fig. 2 is a view, in perspective, of the same. Figs. 3 and 4 respectively represent modified forms of my improvement.

A represents a cylindrical drill, having beveled enlargements B on opposite sides of its upper end for forming a countersink at the mouth of the hole formed by the drill A.

The clearance-space C, formed between the upper edge of the enlargements B and the drill-shank D, is provided with a groove, through which the cuttings are raised from the bottom of the hole by the flutes E, which extend from the point of the drill A throughout its length, and through the beveled enlargements B into the said clearance C. If desired, however, the flutes E, after taking a spiral course on the drill, may turn and traverse the said enlargements in lines parallel with the drill-shank, as shown in Fig. 3 of the drawings.

Each of the cutting-edges formed by the flutes E should be arranged to be diametrically opposite a similar edge, so that, aside from the cutting function performed by them, they will aid in guiding the drill in a true line.

The number of spiral flutes is not necessarily limited to two, although that number will generally be employed; but the drills, if desired, may be formed with three, four, or more of such flutes. Nor is the length or thickness of the drill or the dimensions of the enlargements limited to any given size, as it is apparent that the drills may be varied in size to suit the character of the work to be done by them. Again, instead of forming the clearance by tapering the lower end of the drill-shank, as shown in Figs. 1, 2, and 3 of the drawings, the construction shown in Fig. 4 may be adopted, wherein the shank is itself cylindrical and of less diameter than the width of the tool across the top of its countersinking enlargements B. Nor yet is it necessary to have the drill twisted, for a flat drill, such as shown in Fig. 4 of the drawings, may be used in its stead, if found desirable.

It is proper here to remark that while drills constructed in accordance with my invention are provided each with a device for countersinking the holes drilled by them, such devices in no wise interfere with their use as simple drills. I would therefore have it understood that I do not limit myself to the exact construction shown and described, but hold myself at liberty to make such slight changes and variations as fairly fall within the spirit and scope of my invention.

Having fully described my invention, what I claim as new, and desire to secure by Letters Patent, is—

A metal-boring tool consisting of a cylindrical drill having beveled enlargements on opposite sides of its upper end, provided with a clearance-space between the said enlargements and the drill-shank, and having flutes extending from the point of the drill into the clearance-space, substantially as set forth.

In testimony whereof I have signed this specification in the presence of two subscribing witnesses.

WM. H. SOUTHWICK.

Witnesses:
 GEO. D. SEYMOUR,
 HERMAN MORAN.